(12) United States Patent
Galdámez Peña et al.

(10) Patent No.: US 10,894,861 B2
(45) Date of Patent: Jan. 19, 2021

(54) HIGH MOLECULAR WEIGHT POLYMERS FROM WASTE RAW MATERIALS

(71) Applicant: REPSOL, S.A., Madrid (ES)

(72) Inventors: José Román Galdámez Peña, Madrid (ES); María Dolores Blanco González, Madrid (ES); Sonia Segura Fernández, Madrid (ES); Laura Marín Perales, Madrid (ES); Carolina Ruiz Orta, Madrid (ES); Ana Isabel Real Guerrero, Madrid (ES); Mónica García Ruiz, Madrid (ES)

(73) Assignee: REPSOL, S.A., Madrid (ES)

( * ) Notice: Subject to any disclaimer, the term of this patent is extended or adjusted under 35 U.S.C. 154(b) by 25 days.

(21) Appl. No.: 16/341,801

(22) PCT Filed: Oct. 18, 2017

(86) PCT No.: PCT/EP2017/076627
§ 371 (c)(1),
(2) Date: Apr. 12, 2019

(87) PCT Pub. No.: WO2018/073313
PCT Pub. Date: Apr. 26, 2018

(65) Prior Publication Data
US 2019/0315915 A1 Oct. 17, 2019

(30) Foreign Application Priority Data

Oct. 18, 2016 (EP) ..................... 16382473

(51) Int. Cl.
| | | |
|---|---|---|
| *C08G 64/00* | (2006.01) | |
| *C08G 64/18* | (2006.01) | |
| *C08G 64/34* | (2006.01) | |
| *C08L 23/02* | (2006.01) | |
| *C08L 25/06* | (2006.01) | |
| *C08L 67/04* | (2006.01) | |
| *C08L 69/00* | (2006.01) | |
| *C09J 169/00* | (2006.01) | |

(52) U.S. Cl.
CPC ........... *C08G 64/183* (2013.01); *C08G 64/34* (2013.01); *C08L 23/02* (2013.01); *C08L 25/06* (2013.01); *C08L 67/04* (2013.01); *C08L 69/00* (2013.01); *C09J 169/00* (2013.01); *C08L 2201/10* (2013.01); *C08L 2205/04* (2013.01)

(58) Field of Classification Search
USPC ......................................................... 528/371
See application file for complete search history.

(56) References Cited

U.S. PATENT DOCUMENTS

| | | |
|---|---|---|
| 5,158,922 A | 10/1992 | Hinney et al. |
| 6,630,527 B2 | 10/2003 | Pierre et al. |
| 2006/0224010 A1 | 10/2006 | Hinz et al. |
| 2011/0034612 A1 | 2/2011 | Lyons et al. |
| 2015/0018501 A1 | 1/2015 | Zhang et al. |

FOREIGN PATENT DOCUMENTS

| | | |
|---|---|---|
| EP | 2172507 B1 | 11/2013 |
| WO | 2006103214 A1 | 10/2006 |
| WO | 2009137540 A1 | 11/2009 |
| WO | 2012156431 A1 | 11/2012 |
| WO | 2015009013 A1 | 1/2015 |
| WO | 2015022290 A1 | 2/2015 |

OTHER PUBLICATIONS

International Search Report dated Jan. 25, 2018 re: Application No. PCT/EP2017/076627, pp. 1-3.
Written Opinion dated Jan. 25, 2018 re: Application No. PCT/EP2017/076627, pp. 1-6.

*Primary Examiner* — Terressa Boykin
(74) *Attorney, Agent, or Firm* — Cantor Colburn LLP

(57) ABSTRACT

A polyether carbonate polyol with a nominal functionality of 3 or more includes an equivalent molecular weight between 20,000 and 500,000 Da, and content of between 0.5 wt % and 35 wt % of $CO_2$ based on the total weight of the polyether carbonate polyol. The polyether carbonate polyol has adhesive and impact modifying properties.

11 Claims, 1 Drawing Sheet

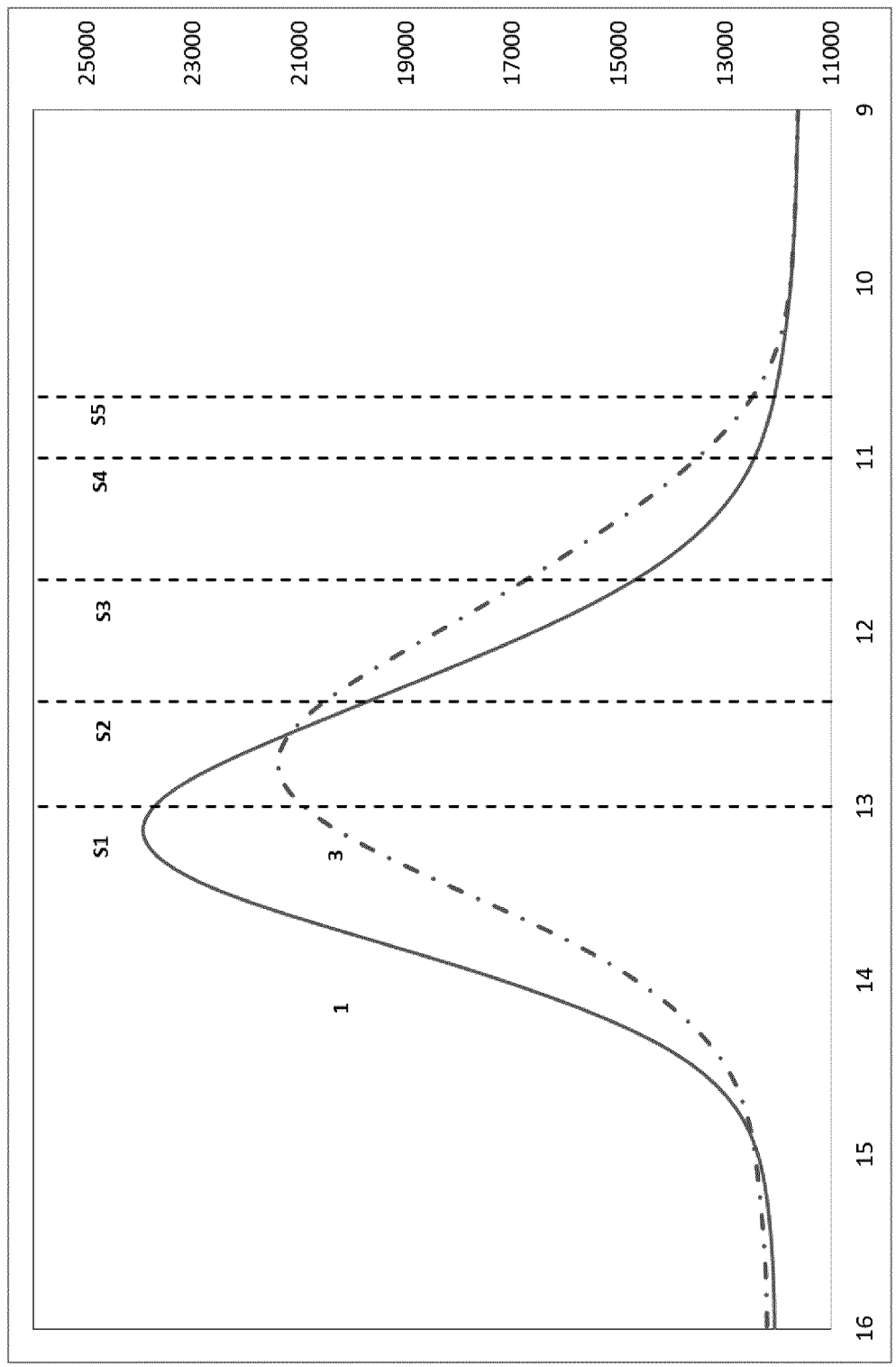

HIGH MOLECULAR WEIGHT POLYMERS FROM WASTE RAW MATERIALS

TECHNICAL FIELD

The disclosure relates to polyether carbonate polyols (PoPCs) of high equivalent molecular weight having improved properties.

BACKGROUND

The industry is always demanding alternative or improved polymers, including alternatives to the current impact modifiers. These substances improve the toughness of polymers and are essential for a number of applications. The most commonly used families of impact modifiers are styrene/butadiene copolymers (SBS copolymers) or acrylonitrile-butadiene-styrene copolymers (ABS co-polymers). Many efforts have been devoted to providing modified derivatives of this family as impact modifiers. For example, in US2011034612A methylmethacrylate-butadiene-styrene (MBS) is disclosed. U.S. Pat. No. 6,630,527 discloses polyester/polycarbonate compositions with improved resistance to UV containing ABS-type impact modifiers. These rubbers are however expensive to produce and unsuitable for some applications, and require alternatives. Further applications for which alternatives are always welcomed is the field of adhesives. Although many different types of polymers exist with adhesive properties, new alternatives and improvements are continually required.

In this context, polyols have been typically used as starting materials of polyurethane polymers, this use attracting most of the polyol production worldwide. Within the family of polyols, PoPCs are attracting interest because they improve the carbon footprint and are relatively easy to make. The number of studies relating to new applications of PoPCs still remains however relatively low when compared to other polyols, and only recently a more intense research of their properties has begun.

EP2172507B is directed to water soluble adhesives based on polyether polycarbonates with a nominal functionality of 2 and a weight-average molecular weight of 50,000-1,000,000 Da. They are prepared by reacting a polyether diol with either an organic carbonate or phosgene. The weight percentage of the polyether diol is preferably at least 50%.

WO2015/009013 discloses polyether carbonate polyols having a number average molecular weight of 40,000-80,000 Da and a functionality of 1 (no chain transfer agent added). Alternatively, polyether carbonate polyols having number average molecular weight of 1,400-13,000 Da are disclosed for those having functionalities of 2 (adipic acid, sebacic acid, 1,10-decandiol or 4,8-bis(hydroxymethyl)tricycle[5.2.1.0]decane).

US2015/0018501 discloses a DMC (double metal cyanide) catalyst providing high alternancies in $CO_2$/epoxide co-catalysis. WO2003/29325 also discloses the preparation of polyether polycarbonate polyols with DMC catalysts, but without making use of polyols as initiators.

WO2009/137540 discloses salcy catalysts for the synthesis of polyether polycarbonate poyol co-polymers, generally with an alternancy above 85% carbonate bonds.

It seems from the prior that more branched polyether carbonate polyols have been of little interest and not ever prepared, maybe because they potentially offer practical difficulties in their use due to ramification and high molecular weight. For example, US2006/0224010 discloses linear polyether polycarbonate polyols with high molecular weight, but when using an adduct of glycerin and propylene oxide as H-functional initiator the resulting weight average molecular weights are about 3,000-20,000 (examples 6 to 10).

SUMMARY

Contrary to the general trends in the prior art, the inventors have prepared new, highly branched, high molecular weight PoPCs which show very interesting and surprising properties. As shown in the experimental section (see example 3), the PoPCs of the disclosure have good impact properties and can be used in mixtures were SBS or MBS copolymers, the most frequently used impact modifiers, fail to provide adequate results. Additionally, the use of the PoPCs of the disclosure improves the carbon footprint with respect to other impact modifiers, as it incorporates carbon dioxide in its structure. Even further, the PoPCs of the disclosure also display good adhesiveness per se, and are thus useful as an adhesive (see example 4). It has been even more surprising that said adhesive properties are maintained at low temperatures. The results show that the PoPCs of the disclosure have significant tack at least at temperatures as low as −20° C.

Thus, according to an aspect, the disclosure is directed to a branched PoPC having a nominal functionality of at least 3 and an equivalent molecular weight of 20,000 to 500,000 Dalton and a content of between 0.5 wt % and 35 wt % of $CO_2$, based on the total weight of the polyether carbonate polyol.

Further aspects of the disclosure are:
A process for the synthesis of the polyether carbonate polyol of the disclosure, comprising the reaction in the presence of a solvent between one or more polymeric polyol initiator comprising at least 3 H-activated functional groups and one or more alkylene oxides in the presence of carbon dioxide and a DMC catalyst.
A blend comprising the polyether carbonate polyol of the disclosure and a second polymer, for example, polylactic acid (PLA), polyalkylencarbonates such as polypropylene carbonate (PPC), polyhydroxyalkanoates such as polyhydroxybutyrate (PHB), polyolefins such as polystyrene (PS), vinyl polymers such as polyvinyl chloride (PVC), polyesters such as Polyethylene terephthalate (PET) or mixtures thereof.
The use of the polyether carbonate polyol of the disclosure as an impact modifier in a polymer blend.
An adhesive composition, preferably a PSA composition, comprising the polyether carbonate polyol of the disclosure.
The use of the polyether carbonate polyol of the disclosure as adhesive, preferably as adhesive at low temperatures.
The use of the polyether carbonate polyol of the disclosure as self-healing material.

BRIEF DESCRIPTION OF THE DRAWINGS

FIG. 1: graph showing the molecular weight distribution of the samples of examples 1 and 3 (marked as curves 1 and 3, respectively). The x-axis provides the retention time (RT) in minutes. The y-axis shows the n-refraction index. Vertical lines mark the different molecular weight standards used: S1 (50,000 g/mol), S2 (100,000 g/mol), S3 (200,000 g/mol), S4 (400,000 g/mol) and S5 (600,000 g/mol). See example 8.

DETAILED DESCRIPTION OF THE DISCLOSURE

Starting Materials for Preparing the PoPCs of the Disclosure

The PoPCs of the disclosure are prepared by a DMC-catalyzed co-polymerization of an alkylene oxide (or a mixture thereof) and $CO_2$, using as initiator a polyol comprising at least 3 H-activated functional groups (polymeric polyol initiator). Thus, the term polyether carbonate polyol (PoPC) should be understood as a polyether polyol having carbon dioxide randomly incorporated in the chemical structure, thus comprising random carbonate (—O—C(=O)—O—) moieties in the chemical structure. The PoPCs obtainable by the processes described herein incorporate between 0.5 wt % and 35 wt % of $CO_2$, based on the total weight of the polyether carbonate polyol, have a nominal functionality of at least 3 and an equivalent molecular weight of 20,000 to 500,000 Dalton.

The term "nominal functionality" in the present disclosure refers to the functionality that a polyol would be expected to have had when considering its monomeric components. For example, a polyether carbonate polyol prepared by the addition of propylene oxide to glycerol (3 hydroxyl groups) will have a nominal functionality of 3. After polymerization, this nominal functionality is reduced, and the measured functionality is typically less than 3. For example, although the nominal functionality can be 3 for a polyol prepared using glycerol as starter, its average measured functionality will be somewhat less than 3, for example, 2.1 or more, or 2.2 or more, or 2.3 or more, or 2.4 or more, 2.5 or more, 2.6 or more, 2.7 or more, 2.8 or more, 2.9 or more. Thus, for a polyether carbonate polyol, the average nominal functionality is the average functionality (the number of active hydrogen atoms) of the initiator or initiators used in its preparation. The disclosure can make use of a single initiator (e.g. glycerol), or a mixture of initiators.

Thus, when a mixture of initiators is used, and it is said in the present disclosure that the polyether carbonate polyol has a nominal functionality of 3 or more, it is meant that the initiators used for its synthesis average 3 or more hydrogen active functional groups. This extends also to mixtures of initiators, where the nominal functionality is the average nominal functionality considering the mixture of initiators, and can be analogously calculated by dividing the total theoretical moles of active hydrogen atoms in the initiator by the total number of moles in the initiator, as described in many manuals available to the skilled person (see for example https://dowac.custhelp.com/app/answers/detail/a_id/13359/related/1). The total number of moles of active hydrogen atoms can be calculated by considering the number of active hydrogen atoms in each initiator and the molar fraction of each initiator with respect of the total moles of initiators. This can be expressed in the formula $\Sigma(x_i n_i)$, wherein $x_i$ is the molar fraction of initiator i, with respect to the total moles of initiators, and $n_i$ is the nominal functionality of said initiator i. This does not preclude from the possibility of using alkylene oxides which have additional hydrogen active functional groups, such as glycidols, which may increase the measured functionality in the final product.

The most frequently used alkylene oxides for PoPCs are ethylene oxide and propylene oxide, or a mixture of both, and are preferred for the purposes of the present disclosure. The art makes many more available to the skilled person, for example, alkylene oxides having from 2 to 24 carbon atoms, for example having 2, 3, 4, 5 or 6 carbon atoms. Such alkylene oxides can be optionally substituted by a residue selected from the group consisting of halogen, $C_4$-$C_{20}$ alkyloxy and $C_6$-$C_{20}$ aryloxy. Typical alkylene oxides have between 2 and 8 carbon atoms. Examples of alkylene oxides include, among others, one or more compounds selected from the group consisting of ethylene oxide, propylene oxide, butene oxides, pentene oxides, hexene oxides, heptene oxides, octene oxides, nonene oxides, decene oxide, undecene oxides, dodecene oxides, alpha-pinene oxide, 2,3-epoxidenorbornene, limonene oxide, stilbene oxides (e.g. chlorostilbene oxides), glycidyl ethers, glycidyl esters, cyclopentene oxide, cyclohexane oxide, cycloheptene oxide, cyclooctene oxide and styrene oxide. Preferred alkylene oxides are the ethylene oxide, propylene oxide, already mentioned, and butane oxide, styrene oxide and mixtures thereof.

The PoPCs of the disclosure have a nominal functionality of at least 3. Groups having active groups which are useful as initiators for the preparation of PoPCs and other polyols are known in the art. The polymeric polyol initiators used to prepare the PoPCs of the disclosure (typically having number average molecular weights between 1,000 and 5,000 Da) are prepared by co-polymerization of low molecular weight pre-polymers (typically having number average molecular weights between 200 and 1,000 Da) in the presence of carbon dioxide and alkylene oxide, which are themselves prepared by polymerization of low molecular weight initiators (e.g. glycerol, sorbitol, etc . . . ). The equivalent molecular weight of the final PoPC can be modulated in different ways. For example, in order to increase the final equivalent molecular weight, it is possible to increase the initial number average molecular weight of the low molecular weight pre-polymers, for example, to a number average molecular weights between 1.000 and below 20,000 Da, for example, between 2,000 and 10,000 Da, or between 10,000 and below 20,000 Da. It is also possible to reduce the proportion of low molecular weight pre-polymer in the reaction, so that chains are forced to grow longer, and/or, in the case of continuous process, tune the residence time.

In order to prepare the low molecular weight pre-polymers, many low molecular weight initiators are available to the skilled person and are routinely used in the preparation of polyols. Suitable low molecular weight initiators include those having nominal functionalities of between 3 and 8, or between 3 and 5, or a nominal functionality of 3 or 4 or having a nominal functionality of 6, 7 or 8. Typical initiators can be found in the reference literature and are used by the skilled person routinely, for example, those mentioned in "Chemistry and Technology of Polyols for Polyurethanes" M. Ionescu, rapra Technology, page 322, table 13.1 (polyhydroxides) or on page 323, table 13.2 (polyamines). The low molecular weight initiators can be, for example, polyols such as those selected from the group consisting of glycerol, trimethylolpropane, triethanolamine, pentaerythritol, dipentaerythritol, alpha-methylglucoside, xylitol, sorbitol, sucrose and mixtures thereof; polyamines such as those selected from the group consisting of ethylenediamine (EDA), diethylene triamine (DETA), ortho-toluene diamine (o-TDA), diphenylmethane diamine (MDA) and mixtures thereof. Combinations of one or more low molecular weight initiators are also possible. Typically, the low molecular weight pre-polymers have a number average molecular weight of more than 200 Da, for example, low molecular weight pre-polymers having number average molecular weights between 400 and 1,000 Da. In the present disclosure, low molecular weight pre-polymers having a number average molecular weight between 300 and 900 are interesting for their ease of preparation. In their preparation one or more alkylene oxides can be used either sequentially (block co-polymers) or simultaneously (random).

Low molecular weight pre-polymers are then further reacted with alkylene oxide(s) and carbon dioxide to prepare the polymeric polyol initiators used as starting materials to prepare the PoPCs of the disclosure. Different polymerization methods (basic, acid, DMC catalysis) are possible. It is also possible to add one or more alkylene oxides which can be used either sequentially (block co-polymers) or simultaneously (random).

Therefore, the polymeric polyol initiators used in the preparation of PoPCs of the disclosure can be polyoxyalkyl carbonate polyols, such as poly(oxypropylene) carbonate polyols, ethylene oxide-capped poly(oxypropylene) carbonate polyols, mixed ethylene oxide-propylene oxide carbonate polyols, poly(oxybutylene) carbonate polymers, or copolymers of carbon dioxide, butylene oxide, ethylene oxide and/or propylene oxide. Most preferred are poly(oxypropylene) carbonate polyols, particularly having from three to eight hydroxyl groups, more preferably three or four hydroxyl groups, preferably having number average molecular weights of more than 1,000 Da, more preferably between 1,000 and 5,000 Da, even more preferably between 2,000 and 4,000 Da.

For example, the procedures described in example 3 of WO2015/022290 are suitable for preparing the low molecular weight pre-polymers (e.g. Having a number average molecular weights between 400 and 1,000 Da) through acid catalysis, which can be then polymerized to the polymeric polyol initiators (e.g. having a number average molecular weights between 1,000 and 5,000 Da) using the methods of examples 4-12 of the same application.

DMC Catalysts for the Preparation of PoPCs

Also, many DMC catalysts are available in art to the prepare PoPCs. Preferred DMC catalysts to prepare the PoPCs of the disclosure are described in WO2015/022290, WO2012156431A1 (e.g. see examples 2 and 3) or European patent applications EP15382178 or EP15382413. A typical method to prepare the DMC catalyst comprises:

a) synthesizing a solid double metal cyanide catalyst in the presence of an organic complexing agent and a polyether polyol ligand; and b) first washing the catalyst obtained in step a) with an aqueous solution optionally comprising further polyether polyol ligand (e.g. up to 10% by weight of a polyether polyol ligand) to form a slurry.

The DMC catalyst preparation method may further comprise:

c) isolating the catalyst from the slurry obtained in step b); and d) washing the solid catalyst obtained in step c) with a solution comprising optionally further polyether polyol ligand (e.g. up to 10% by weight of a polyether polyol ligand).

Step a)

This step can be performed by any method known in the prior art for the synthesis of a DMC catalyst. Preferably, this step can be carried out by reacting, in an aqueous solution, a water-soluble metal salt (in excess) and a water-soluble metal cyanide salt in the presence of a polyether polyol ligand and an organic complexing agent.

Preferably, the aqueous solutions of a water-soluble metal salt and a water-soluble metal cyanide salt are first reacted in the presence of the organic complexing agent using efficient mixing to produce a catalyst slurry. The metal salt is used in excess; for example, the molar ratio of metal salt to metal cyanide salt is between 2:1 and 50:1, more preferably between 10:1 and 40:1. This catalyst slurry contains the reaction product of the metal salt and the metal cyanide salt, which is a double metal cyanide compound. Also present are excess metal salt, water, and organic complexing agent, all of which are incorporated to some extent in the catalyst structure. The mixture of the aqueous solution containing the water-soluble metal salt and the aqueous solution containing the water-soluble metal cyanide salt preferably takes place at a temperature ranging from 30 to 70° C., more preferably from 40 to 60° C., even more preferably at about 50° C.

The water-soluble metal salt preferably has the general formula MA, wherein:

M is a cation selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III). Preferably, M is a cation selected from Zn(II), Fe(II), Ni(II), Mn(II) and Co(II);

A is an anion selected from the group consisting of halide, hydroxide, sulfate, carbonate, vanadate, cyanide, oxalate, thiocyanate, isocyanate, isothiocyanate, carboxylate and nitrate. Preferably, A is a cation selected from halide; and n is 1, 2 or 3 and satisfies the valency state of M.

Examples of suitable metal salts include, but are not limited to, zinc chloride, zinc bromide, zinc acetate, zinc acetonylacetonate, zinc benzoate, zinc nitrate, iron(II) sulfate, iron(II) bromide, cobalt(II) chloride, cobalt(II) thiocyanate, nickel(II) formate, nickel(II) nitrate and the like and mixtures thereof. Zinc chloride is preferred. The water-soluble metal cyanide salts preferably have the formula $D_x[E_y(CN)_6]$, wherein:

D is an alkali metal ion or alkaline earth metal ion; E is a cation selected from the group consisting of Co(II), Co(III), Fe(II), Fe(III), Mn(II), Mn(III), Cr(II), Cr(III), Ni(II), Ir(III), Rh(III), Ru(II), V(IV) and V(V). Preferably, E is selected from Co(II), Fe(II), Ni(II), Co(III) and Fe(III); and x and y are integers greater than or equal to 1, the sum of the charges of x and y balances the charge of the cyanide (CN) group.

Suitable water-soluble metal cyanide salts include, but are not limited to, potassium hexacyanocobaltate (III), potassium hexacyanoferrate (II), potassium hexacyanoferrate (III), calcium hexacyanocobaltate (III), lithium hexacyanocobaltate (III), and the like. Typically, the metal cyanide salt is potassium hexacyanocobaltate (III).

The organic complexing agent can be included with either or both of the aqueous salt solutions, or it can be added to the catalyst slurry immediately following precipitation of the DMC compound. It is generally preferred to pre-mix the organic complexing agent with either aqueous solution before combining the reactants. Usually, an excess amount of the complexing agent is used. Typically, the molar ratio of complexing agent to metal cyanide salt is between 10:1 and 100:1, preferably between 10:1 and 50:1, more preferably between 20:1 and 40:1.

Generally, the complexing agent must be relatively soluble in water. Suitable organic complexing agents are those commonly known in the art, for example in U.S. Pat. No. 5,158,922. Preferred organic complexing agents are water-soluble heteroatom-containing organic compounds that can complex with the double metal cyanide compound. According to the present disclosure, the organic complexing agent is not a polyether polyol. More preferably, the organic complexing agents are water-soluble heteroatom-containing compounds selected from monoalcohols, aldehydes, ketones, ethers, esters, amides, ureas, nitriles, sulfides and mixtures thereof. Preferred organic complexing agents are water-soluble aliphatic alcohols, preferably $C_1$-$C_6$ aliphatic alcohols, selected from the group consisting of ethanol, isopropyl alcohol, n-butyl alcohol, iso-butyl alcohol, sec-butyl alcohol and tert-butyl alcohol. Tert-butyl alcohol (TBA) is particularly preferred.

Preferably, the aqueous metal salt and metal cyanide salt solutions (or their DMC reaction product) are efficiently mixed with the organic complexing agent. A stirrer can be conveniently used to achieve efficient mixing.

Examples of double metal cyanide compounds resulting from this reaction include, for example, zinc hexacyanocobaltate (III), zinc hexacyanoferrate (III), nickel hexacyanoferrate (II), cobalt hexacyanocobaltate (III) and the like. Zinc hexacyanocobaltate (III) is preferred.

The catalyst slurry produced after the mixing of the aqueous solutions in the presence of the organic complexing agent is then combined with a polyether polyol ligand. This step is preferably performed using a stirrer so that an efficient mixture of the catalyst slurry and the polyether polyol takes place.

This mixture is preferably performed at a temperature ranging from 30 to 70° C., more preferably from 40 to 60° C., even more preferably at about 50° C.

Suitable polyether polyols include those produced by ring-opening polymerization of cyclic ethers, and include epoxide polymers, oxetane polymers, tetrahydrofuran polymers and the like. Any method of catalysis can be used to make the polyethers. The polyethers can have any desired end groups, including, for example, hydroxyl, amine, ester, ether or the like. Preferred polyethers are polyether polyols having average hydroxyl functionalities from about 2 to about 8. Also preferred are polyether polyols having a number average molecular weight lower than 2000 Da, more preferably between 200 and 1000 Da, even more preferably between 300 and 800 Da. These are usually made by polymerizing epoxides in the presence of active hydrogen-containing initiators and basic, acidic or organometallic catalysts (including DMC catalysts).

Useful polyether polyols include poly(oxypropylene) polyols, ethylene oxide-capped poly(oxypropylene) polyols, mixed ethylene oxide-propylene oxide polyols, butylenes oxide polymers, butylenes oxide copolymers with ethylene oxide and/or propylene oxide, polytetra methylene ether glycols and the like. Most preferred are poly(oxypropylene) polyols, particularly diols and triols having number average molecular weights lower than 2000 Da, more preferably between 200 and 1000, even more preferably between 300 and 800.

More preferably, the polyether polyol used in the preparation of the DMC catalyst has been synthesized by acidic catalysis, i.e. by polymerizing an epoxide in the presence of active hydrogen-containing initiator and acidic catalysts. Examples of suitable acidic catalysts include Lewis acids such as $BF_3$, $SbF_5$, $Y(CF_3SO_3)_3$, or Brönsted acids such as $CF_3SO_3H$, $HBF_4$, $HPF_6$, $HSbF_6$. For example, the polyether polyol ligand is a poly(oxypropylene) polyol with a number average molecular weight between 200 and 1000 Da, preferably between 300 and 800, obtained by basic catalysis. Alternatively, the polyether polyol ligand is a poly(oxypropylene) polyol with a number average molecular weight between 200 and 1000 Da, preferably between 300 and 800, obtained by acidic catalysis. Using a polyether polyol obtained by acidic catalysis in the preparation of the DMC catalyst is preferred. Once the polyether polyol has been combined with the double metal cyanide compound, a polyether polyol-containing solid catalyst is isolated from the catalyst slurry. This is accomplished by any convenient means, such as filtration, centrifugation or the like.

Preferably, enough reactants are used to give a solid DMC catalyst that contains:
  30-80% by weight of the double metal cyanide compound;
  1-10% by weight of water;
  1-30% by weight of the organic complexing agent; and
  1-30% by weight of the polyether polyol ligand.

Preferably, the total amount of the organic complexing agent and the polyether polyol is from 5% to 60% by weight with respect to the total weight of the catalyst, more preferably from 10% to 50% by weight, even more preferably from 15% to 40% by weight.

Steps b) and c)

The isolated polyether polyol-containing solid catalyst is then first washed with an aqueous solution comprising 90-100% by weight of water and 0-10% by weight of a polyether polyol based on the total weight of said aqueous solution. This aqueous solution is preferably absent of any organic complexing agent as those mentioned above. No other washing step is performed before this first washing step once the isolated solid DMC catalyst has been obtained in step a). The polyether polyol used in step b) is as defined above for step a).

Preferably, the amount of polyether polyol ligand in the aqueous solution in step b) is lower than 5% by weight with respect to the total weight of the aqueous solution, for example, lower than 4% by weight with respect to the total weight of solution, preferably lower than 3%. The amount of polyether polyol ligand in the aqueous solution in step b) can be between 0.05% and 10% by weight with respect to the total weight of solution, preferably between 0.1% and 2%, more preferably between 0.3% and 1.8%.

In step b) the water and the polyether polyol ligand can be brought into contact with the catalyst obtained in step a) simultaneously or consecutively. That is, the aqueous solution in step b) can already contain both the water and the polyether polyol ligand when brought into contact with the catalyst obtained in step a) ("simultaneous bringing into contact") or the catalyst obtained in step a) can be first brought into contact with one of the individual components (the water or the polyether polyol ligand) and the resulting mixture then brought into contact with the other individual component ("consecutive bringing into contact"). Typically, the water and the polyether polyol ligand are brought into contact with the catalyst obtained in step a) consecutively. For example, the catalyst obtained in step a) is first brought into contact with water and then brought into contact with the polyether polyol ligand which is preferably in a 0.1 to 5%, more preferably in 0.1 to 3%, by weight with respect to the total weight of the aqueous solution.

This washing step is generally accomplished by reslurrying the catalyst in the aqueous solution followed by a catalyst isolation step (step c)) using any convenient means, such as filtration.

It has also been particularly advantageous to use this aqueous solution in the washing step b) in combination with an excess amount of the organic complexing agent in step a) and/or d).

Step d)

Although a single washing step suffices, further wash steps are possible. In a preferred embodiment, the subsequent wash is non-aqueous and includes the reslurry of the double metal cyanide catalyst in an organic complexing agent or in a mixture of the organic complexing agent and the polyether polyol used in the previous washing step. More preferably, the double metal cyanide catalyst is washed with a solution comprising 90-100% by weight of the organic complexing agent and 0-10% by weight of the polyether polyol, with respect to the total weight of the solution. The polyether polyol used in step d) is as defined above for step a).

Preferably, the amount of polyether polyol in the solution in step d) is lower than 5% by weight with respect to the total weight of solution, for example lower than 4% by weight with respect to the total weight of solution, preferably lower than 3%. Typically, the amount of polyether polyol in step d) is between 0.05% and 5% by weight with respect to the total weight of solution, preferably between 0.1% and 2%, more preferably between 0.3% and 1.8%.

The organic complexing agent is preferably tert-butyl alcohol. The polyether polyol is preferably a poly(oxypropylene) polyol, more preferably a poly(oxypropylene) polyol having a number average molecular weight lower than 2000 Da, more preferably from 200 to 1000 Da or from 300 to 800 Da, and which has been synthesized by acidic catalysis.

Typically, the molar ratio of complexing agent to metal cyanide salt is between 10:1 and 200:1, preferably between 20:1 and 150:1, more preferably between 50:1 and 150:1.

In step d) the organic complexing agent and the polyether polyol can be brought into contact with the solid catalyst obtained in step c) simultaneously or consecutively. For example, they are brought into contact with the solid catalyst obtained in step c) consecutively. Preferably, the catalyst obtained in step c) is first brought into contact with the organic complexing agent and then brought into contact with the polyether polyol.

After the catalyst has been washed, it is usually preferred to dry it under vacuum until the catalyst reaches a constant weight. The catalyst can be dried at temperatures within the range of about 50° C. to 120° C., more preferably from 60° C. to 110° C., even more preferably from 90° C. to 110° C. The dry catalyst can be crushed to yield a highly active catalyst in powder form appropriate for use in the co-polymerization process of the disclosure.

For example, the double metal cyanide compound is zinc hexacyanocobaltate (III), the organic complexing agent is tert-butyl alcohol and the polyether polyol is a poly(oxypropylene) polyol. Preferably the polyether polyol is a poly(oxypropylene) polyol, more preferably a poly(oxypropylene) polyol having a number average molecular weight lower than 2000 Da, more preferably from 200 to 1000 Da or from 300 to 800 Da, and which has been synthesized by acidic catalysis.

Process for the Preparation of PoPCs of the Disclosure

The process for the preparation of PoPCs of the present disclosure can be carried out continuously, semi-batch-wise or discontinuously. Suitable exemplary processes for the synthesis of the PoPCs of the disclosure are described in WO2015/022290 or European patent applications EP15382178 or EP15382413.

The process preferably comprises at least one activation step of the DMC catalyst before the co-polymerization reaction. More activation steps can be done, e.g., two, three, four or five, and the reaction many times proceeds more efficiently by using two, three or four activation steps.

Operation of said activation steps is well known to the skilled person, and activation is achieved when a temperature peak ("hotspot") and/or pressure drop in the reactor is observed. For the activation of the DMC catalyst, typically a partial amount of alkylene oxide (based on the total amount of alkylene oxide used for the preparation of the PoPC of the disclosure) is added to a mixture comprising the DMC catalyst and the polymeric polyol initiator in the absence or in the presence of carbon dioxide. Frequently, at least one activation step is performed in the absence of carbon dioxide, but not necessarily, and all the activation steps can be performed in the presence of carbon dioxide. In the present disclosure PoPCs can be prepared by performing the first activation steps in the absence of carbon dioxide and the last activation step is performed in the presence of carbon dioxide. For example, a suitable activation sequence can involve two, three or four activation steps involving each copolymerization reaction by adding a partial amount of the alkylene oxide(s) to a mixture comprising the DMC catalyst and the polymeric polyol initiator, and wherein at least the first activation step is performed in the absence of carbon dioxide and, optionally, the last activation step is performed in the presence of carbon dioxide. A further suitable sequence comprises two activation steps, wherein the first one is performed in the absence of carbon dioxide and the second one in the presence of carbon dioxide. A still further suitable activation sequenced may comprise three activation steps, wherein the first two are performed in the absence of carbon dioxide and the third one in the presence of carbon dioxide. A further activation sequence involves four activation steps wherein the first three are performed in the absence of carbon dioxide and the fourth one in the presence of carbon dioxide. Further suitable activation sequences are available to the skilled person, for example, involving more activation steps in the presence of carbon dioxide. Exemplary activation sequences involve three activation steps, wherein the first one is performed in the absence of carbon dioxide and the second and third ones in the presence of carbon dioxide, or comprising four activation steps, wherein the first one is performed in the absence of carbon dioxide and the other three in the presence of carbon dioxide.

Thus, in order to activate the catalyst, a partial amount of alkylene oxide(s) is added. Said partial amount of alkylene oxide in each step can be from 0.05 to 15.0 wt %, or from 0.1 to 15.0 wt %, or form 1.0 to 15.0 wt %, for example, from 2.0 to 13.0 wt %, preferably from 2.5 to 10.0 wt %, or from 0.5 to 15.0 wt %, preferably from 0.3 to 13.0 wt %, preferably from 0.5 to 10.0 wt %, based on the total amount of alkylene oxide used to prepare the PoPC of the disclosure.

The activation steps can be performed at a temperature of from 100 to 200° C., more preferably from 110 to 150° C. This temperature can be adjusted by the skilled person according to the particular characteristics of each process (amounts used for initiation, reactor type, agitation, etc.).

Once the DMC catalyst has been activated, the co-polymerization reaction to obtain the PoPC of the disclosure involves the co-polymerization reaction of alkylene oxide(s) and carbon dioxide. The carbon dioxide pressure may vary, but typical values are between 1 and 100 bar, e.g. from 2 to 60 bar, or from 5 to 50 bar. The DMC catalyst can be used in an amount of from 30 to 1000 ppm, preferably from 50 to 500 ppm, more preferably from 100 to 450 ppm, with respect to the total weight of the final PoPC. The co-polymerization reaction is preferably performed at a temperature of from 70 to 150° C., more preferably from 70 to 120° C., more preferably from 80 to 110° C. Further suitable exemplary conditions are disclosed in WO2015/022290 or European patent applications EP15382178 or EP15382413.

A more detailed description of an exemplary process to produce the PoPCs of the disclosure comprises the following steps:

(i) Placing the polymeric polyol initiator in a vessel and applying heat and/or vacuum ("drying"), preferably with $N_2$ stripping, wherein the DMC catalyst is added to the polymeric polyol initiator before or after the drying, typically after drying. The skilled person can determine the most suitable temperature, which for this kind of processes is often from 50 to 200° C., typically from 80 to 160° C., preferably from 110 to 150° C. Reduced pressure is then applied, typically to less than 500 mbar, e.g. from 5 to 100 mbar. Exemplary conditions comprise subjecting the polymeric polyol initiator to a temperature from 110 to 150° C. and to a pressure from 5 to 100 mbar and then adding the DMC catalyst.

(ii-1) In a first activation step, adding a first partial amount of alkylene oxide (based on the total amount of alkylene oxide used) to the mixture resulting from step (i), in the presence of $CO_2$ or, preferably, in the absence of $CO_2$, (ii-2) In a second activation step, after the activation in the preceding step has been observed, adding a second partial amount of alkylene oxide (based on the total amount of alkylene oxide used) to the mixture resulting from the preceding step, in the presence or in the absence of $CO_2$.

(ii-3) optionally, in a third activation step, after the activation in the preceding step has been observed, adding a third partial amount of alkylene oxide (based on the total amount of alkylene oxide) to the mixture resulting from the preceding step, in the presence or in the absence of $CO_2$.

(ii-4) optionally, in a further activation step, after the activation in the preceding step has been observed, adding a fourth partial amount of alkylene oxide (based on the total amount of alkylene oxide) to the mixture resulting from the preceding step in the presence of $CO_2$.

(iii) Metering the rest of alkylene oxide(s) and carbon dioxide into the mixture from the previous step ("copolimerization"). The alkylene oxide used for the copolymerisation can be the same as or different from the alkylene oxide used in the activation or it can be a mixture of two or more alkylene oxides. Usually the alkylene oxide used for the copolymerisation is the same as the alkylene oxide used in the activation.

The addition of alkylene oxide and of the carbon dioxide can take place simultaneously or sequentially, and it is possible for the entire amount of carbon dioxide to be added once or in a metered manner over the reaction time. A metered addition of the carbon dioxide is preferred.

In order to obtain PoPCs of ever higher molecular weight, it is also possible to obtain a PoPC according to the disclosure, and subsequently submitting it to a further polymerization following the process of the present disclosure. For example, once a PoPC having an equivalent molecular weight comprised between 20,000 and 50,000 Da is obtained, it can be submitted to a further polymerization process described herein. Also, the residence time can be tuned to control the final molecular weight of the product.

The preparation of the PoPCs of the disclosure is performed in the presence of a solvent, such as non-protic solvents, e.g. cyclic carbonates, being preferred. Other useful solvents are, for example, polar such as acetone, methyl ethyl ketone, ethyl acetate, methyl acetate, dichloromethane, chloroform, acetonitrile, tetrahydrofurane, dimethylformamide, sulfolane, dimethylsulfoxide, N-methyl pyrolidone, or a-polar such as hexane, xylene or toluene. The solvent is added in amounts necessary to aid in handling the resulting PoPC, which typically range between 1:20 and 20:1 by weight, for example 1:10 and 10:1 by weight with respect to the total amount of alkyleneoxide and initiator added, more typically between 1:5 and 5:1 by weight, or between 1:2 and 2:1 by weight.

The process for the preparation of a PoPCs of the disclosure may include a curing agent, e.g. one or two curing agents. Such species are widely known in the field and can be, for example, those mentioned in EP2845878. Non-limitative examples of curing agents can be selected from an isocyanate-based compound, a melamine-based compound, an amine-based compound, an acid anhydride-based compound, an imidazole-based compound and a mercaptan-based compound.

The isocyanate-based curing agent may be at least one selected from the group consisting of 2,4-trilene diisocyanate, 2,6-trilene diisocyanate, hydrogenated trilene diisocyanate, 1,3-xylene diisocyanate, 1,4-xylene diisocyanate, diphenyl methane-4,4-diisocyanate, 1,3-bisisocyanatomethyl cyclohexane, tetramethyl xylene diisocyanate, 1,5-naphthalene diisocyanate, 2,2,4-trimethyl hexamethylene diisocyanate, 2,4,4-trimethyl hexamethylene diisocyanate, triphenylmethane triisocyanate, and at least one type of an adduct type, a biuret type and a trimer thereof.

The melamine-based curing agent may be at least one selected from the group consisting of hexa methoxy methyl melamine, hexa ethoxy methyl melamine, hexa propoxy methyl melamine, hexa butoxy methyl melamine, hexa pentyloxy methyl melamine and hexa hexyloxy methyl melamine.

The amine-based curing agent may be a linear amine, an aliphatic amine, a modified aliphatic amine, an aromatic amine, a secondary amine and a tertiary amine. Non-limitative examples of amine-based compounds are benzyldimethyl amine, triethanol amine, triethylene tetra mine, diethylene triamine, triethylene amine, dimethylaminoethanol or tridimethylaminomethylphenol.

The acid anhydride-based curing agent may be at least one selected from the group consisting of phthalic anhydride, maleic anhydride, trimellitic anhydride, pyromellitic anhydride, hexahydrophthalic anhydride, tetrahydrophthalic anhydride, methylnadic anhydride, nadic anhydride, and methylhexahydrophthalic anhydride.

The imidazole-based curing agent may be at least one selected from the group consisting of imidazole, isoimidazole, 2-methylimidazole, 2-ethyl-4-methylimidazole, 2,4-dimethylimidazole, butylimidazole, 2-heptadecenyl-4-methylimidazole, 2-methylimidazole, 2-undecenylimidazole, 1-vinyl-2-methylimidazole, 2-n-heptadecylimidazole, 2-undecylimidazole, 2-heptadecylimidazole, 2-phenylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-mthylimidazole, an added product of the imidazole and methylimidazole, an added product of the imidazole and trimellitic acid, 2-n-heptadecyl-4-methylimidazole, phenylimidazole, benzylimidazole, 2-methyl-4,5-diphenylimidazole, 2,3,5-triphenylimidazole, 2-styrylimidazole, 1-(dodecylbenzyl)-2-methylimidazole, 2-(2-hydroxy-4-t-butylphenyl)-4,5-diphenylimidazole, 2-(2-methoxyphenyl)-4,5-diphenylimidazole, 2-(3-hydroxyphenyl)-4,5-diphenylimidazole, 2-(p-dimethyl-aminophenyl)-4,5-diphenylimidazole, 2-(2-hydroxyphenyl)-4,5-diphenylimidazole, di(4,5-diphenyl-2-imidazole)-benzyl-1,4,2-naphthyl-4,5-diphenylimidazole, 1-benzyl-2-methylimidazole, and 2-p-methoxystyrylimidazole.

The mercaptan-based curing agent may be at least one selected from the group consisting of pentaerythritol, tetrathio glycol, polysulfide, and trioxane trimethylene mercaptan.

The resulting PoPC can be subject to a purification process in order to eliminate solvents and other impurities. Several purification methods are possible, such as recrystallization, precipitation, or distillation (e.g. thin-film distillation). In an exemplary process the PoPC containing solvent (e.g. cyclic carbonate) is dissolved in a suitable solvent to form a homogeneous solution (e.g. apolar solvent such as dichloromethane) and then a polar protic solvent is added (e.g. an alcohol such as isopropanol or ethanol), causing the precipitation of the PoPC, while the solvent remains dissolved.

PoPC of the Disclosure

Preferably, the PoPCs obtained according to the process of the present disclosure have a $CO_2$ weight percentage between 5 wt % and 35 wt %, for example, between 10 wt % and 35 wt %, or between 12 wt % and 33 wt %, or between 12 wt % and 30 wt %, or between 20 wt % and 35 wt %, or between 22 wt % and 33 wt %, or between 21 wt % and 35 wt %, or between 25 wt % and 35 wt %, or between 25 wt % and 30 wt %, based on the total weight of the PoPC. Exemplary percentages of $CO_2$ are at least 5 wt %, or at least 10 wt %, or at least 20 wt %, based on the total weight of the PoPC. It is also important that the PoPC of the disclosure has a high equivalent molecular weight. As used in the present disclosure, "equivalent molecular weight" refers to the number average molecular weight divided by the number of H-activated functional groups (number of H-activated hydroxyl groups of the polyol). The equivalent molecular weight is calculated according to the formula Equivalent molecular weight=56,100/*IOH* wherein IOH is the hydroxyl number in mg of KOH per grams of sample, as calculated according to ASTM E1899-16.

The weight-averaged molecular weights (Mw) were determined against polystyrene standards by gel-permeation chromatography (GPC) using two PLGel Mixed C columns connected in series using a 1 ml/min THF flow without stabilizer, and a refraction index detector (RID) at 35° C. in an Agilent 1260 series HPLC. The solvent in the samples and the standards was THF without stabilizer. Different standards were used having different molecular weights.

Preferred equivalent molecular weights are selected from the following ranges: 20,000 and 300,000 Da, preferably up to 200,000 Da, between 25,000 and 250,000, between 25,000 and 75,000 Da, between 20,000 and 400,000 Da, for example up to 300,000 Da, between 30,000 and 220,000 Da, between 30,000 and 180,000 Da, between 40,000 and 160,000 Da. Further equivalent molecular weights can be selected from the following ranges: between 20,000 and 200,000 Da, between 20,000 and 175,000 Da, between 20,000 and 150,000 Da, between 20,000 and 125,000 Da, between 20,000 and 100,000 Da or between 20,000 and 75,000.

The inventors have observed that the PoPCs of the disclosure display high polydispersity. PoPC 1 of the examples has a polydispersity of 2.1, and PoPC 3 a polydispersity of 2.4. Thus, according to an embodiment of the disclosure, the PoPCs of the disclosure have a polydispersity equal to or higher than 1.5, preferably equal to or higher than 1.7, preferably equal to or higher than 1.8, preferably equal to or higher than 1.9, preferably equal to or higher than 2.0, preferably equal to or higher than 2.1. For example, the PoPC of the disclosure can have a polydispersity comprised between 1.5 and 5.0, or between 1.6 and 4.0, or between 1.6 and 3.0, for example, between 1.8 and 4.5, or between 1.8 and 3.5.

Thus, the present disclosure can be directed to a branched PoPC having a nominal functionality of at least 3 and an equivalent molecular weight of 20,000 to 500,000 Dalton, a polydispersity equal to or higher than 1.6 and a content of between 0.5 wt % and 35 wt % of $CO_2$, based on the total weight of the polyether carbonate polyol.

For example, the branched PoPC has a nominal functionality of at least 3 and an equivalent molecular weight of 20,000 to 500,000 Dalton, a polydispersity comprised between 1.6 and 5.0 and a content of between 0.5 wt % and 35 wt % of $CO_2$, based on the total weight of the polyether carbonate polyol.

In the present disclosure it is preferred that in the PoPC of the disclosure the weight percentage of molecules having a weight-averaged molecular weight above 100,000 is equal to or greater than 3 wt %, preferably equal to or greater than 4 wt %, preferably equal to or greater than 5 wt %, preferably equal to or greater than 6 wt %, based on the total weight of the PoPC. For example, a weight percentage of molecules having a weight-averaged molecular weight above 100,000 comprised between 3 wt % and 30 wt %, for example between 3 wt % and 20 wt %, for example, between 3 wt % and 15 wt %, or between 3 wt % and 10 wt %, based on the total weight of the PoPC.

Alternatively, it is preferred that the weight percentage of molecules having a weight-averaged molecular weight above 200,000 is equal to or greater than 0.5 wt %, preferably equal to or greater than 1 wt %, based on the total weight of the PoPC. For example, a weight percentage of molecules having a weight-averaged molecular weight above 200,000 comprised between 0.5 wt % and 20 wt %, for example between 0.5 wt % and 10 wt %, for example, between 1 wt % and 9 wt %, or between 1 wt % and 8 wt %, based on the total weight of the PoPC.

For example, the branched PoPC of the disclosure presents the following combination of weight-averaged molecular weight distributions:

the weight percentage of molecules having a weight-averaged molecular weight above 100,000 is equal to or greater than 3 wt %, based on the total weight of the PoPC, and the weight percentage of molecules having a weight-averaged molecular weight above 200,000 is equal to or greater than 0.5 wt %, based on the total weight of the PoPC;

the weight percentage of molecules having a weight-averaged molecular weight above 100,000 is equal to or greater than 4 wt %, based on the total weight of the PoPC, and the weight percentage of molecules having a weight-averaged molecular weight above 200,000 is equal to or greater than 1 wt %, based on the total weight of the PoPC;

the weight percentage of molecules having a weight-averaged molecular weight above 100,000 is comprised between 3 wt % and 30 wt %, based on the total weight of the PoPC, and the weight percentage of molecules having a weight-averaged molecular weight above 200,000 is comprised between 0.5 wt % and 20 wt %, based on the total weight of the PoPC; or the weight percentage of molecules having a weight-averaged molecular weight above 100,000 is comprised between 3 wt % and 20 wt %, based on the total weight of the PoPC, and the weight percentage of molecules having a weight-averaged molecular weight above 200, 000 is comprised between 0.5 wt % and 20 wt %, based on the total weight of the PoPC.

According to preferred embodiment, the branched PoPC has a nominal functionality of at least 3 and an equivalent molecular weight of 20,000 to 75,000 Dalton, and a content of between 0.5 wt % and 35 wt % of $CO_2$, based on the total weight of the polyether carbonate polyol, wherein the weight percentage of molecules having a weight-averaged molecular weight above 100,000 is equal to or greater than 3 wt %, preferably equal to or greater than 4 wt %, preferably equal to or greater than 5 wt %, preferably equal to or greater than 6 wt %, based on the total weight of the PoPC. For example, a weight percentage of molecules having a weight-averaged molecular weight above 100,000 comprised between 3 wt % and 30 wt %, for example between 3 wt % and 20 wt %, for example, between 3 wt % and 15 wt %, or between 3 wt % and 10 wt %, based on the total weight of the PoPC.

According to preferred embodiment, the branched PoPC has a nominal functionality of at least 3 and an equivalent molecular weight of 20,000 to 75,000 Dalton, and a content of between 0.5 wt % and 35 wt % of $CO_2$, based on the total weight of the polyether carbonate polyol, wherein the weight percentage of molecules having a weight-averaged molecular weight above 200,000 is equal to or greater than 0.5 wt %, preferably equal to or greater than 1 wt %, based on the total weight of the PoPC. For example, a weight percentage of molecules having a weight-averaged molecular weight above 200,000 comprised between 0.5 wt % and 20 wt %, for example between 0.5 wt % and 10 wt %, for example, between 1 wt % and 9 wt %, or between 1 wt % and 8 wt %, based on the total weight of the PoPC.

As indicated above, the weight-averaged molecular weights (Mw) and the weight percentage of molecules having a weight-averaged molecular weight above 100,000 were determined against polystyrene standards by gel-permeation chromatography (GPC) using two PLGel Mixed C columns connected in series using a 1 ml/min THF flow without stabilizer, and a refraction index detector (RID) at 35° C. in an Agilent 1260 series HPLC. The solvent in the samples and the standards was THF without stabilizer. Different standards were used having different molecular weights.

It is preferred that the PoPC of the disclosure has a random carbonate polyol percentage of, for example, between 0.5 mol % and 40 mol %, or between 5 mol % and 40 mol %, or 10 mol % and 35 mol %, or 20 mol % and 35 mol %, or 25 mol % and 35 mol %, or 20 mol % and 32 mol %, or 25 mol % and 31 mol %, based on the total moles of the PoPC.

It has also been surprising that the PoPCs of the disclosure are capable of self-healing after suffering damage. The PoPCs of the disclosure show quantitative healing efficiency without the addition of a specific catalyst or an external stimulus such as heat or light. The self-healing process takes place in a reduced period of time and without the need of any external stimulus. For example, when the material is cut it restores physical integrity again by putting the pieces in contact together. That is, the PoPCs of the disclosure totally or partially recover their structure after suffering damage, thereby recovering their physical integrity totally or partially. Self-healing materials have applications in numerous products, such as tubes, protection surfaces in general, tires, all kinds of leak-tight materials (e.g. fuel tanks), packaging, films, different types of vessels, insulation, coating (e.g. electrical cables, optical cables), all within a wide range of industries, including, automotive, marine, construction and/or aerospace industries. Effective self-healing materials increase the life of products and significantly reduce related maintenance expenditure.

PSA Compositions

The PoPCs of the disclosure show tackiness. It is especially surprising the tackiness shown at low temperatures. It is thus another aspect of the disclosure a PSA composition comprising the PoPCs of the disclosure.

The skilled person knows how to prepare PSA compositions and can choose among a wide variety of additives known in the art, for example, from Encyclopedia of Polymer Science and Engineering, 2nd Ed., vol. 14, p. 327-410, 1988 or other reference information.

In addition to the PoPCs of the disclosure, such PSA compositions may further comprise further usual additives used in the preparation of PSA adhesive compositions. For example, the PSA composition comprises 0 to 5 wt % of one or more further additives, based on the total weight of the composition. Further non-limitative ranges of additive content are comprised between 0.01 and 5 wt %, preferably from 0.01 to 3 wt %, more preferably from 0.05 to 2 wt %, even more preferably from 0.05 to 0.5 wt %. Typical additives are well known in the art. Examples of these additives include antioxidants, such as sterically hindered phenols, phosphites, thioethers or thioesters; stabilizers; antislipping agents, such as amide derivatives; colorants, such as titanium dioxide; fillers, such as talc, clay and calcium carbonate.

PSA compositions can optionally include plasticizers (e.g., benzoates such as 1,4-cyclohexane dimethanol dibenzoate, glyceryl tribenzoate, or pentaerythritol tetrabenzoate, phthalates, paraffin oils, polyisobutylene, chlorinated paraffins, etc.), for example, from 0.1 to 5 wt of at least one plasticizer, based on the total weight of the composition. Alternatively, the PSA composition may comprise from 0.5 to 10 wt %, for example from 1 to 10 wt %, or from 1 to 5 wt %, of at least one plasticizer. Said plasticizer can be selected from medicinal white oils, mineral oils, vegetal or animal oils; alkyl esters of aliphatic or aromatic carboxylic acids, such as adipates, sebacates, phthalates, citrates, benzoates, mellitates and aromatic sulphonates; alcohols, glycols or polyols, including polyether polyols and polyester polyols; and mixtures thereof.

The PSA composition may also comprise from 0 to 5 wt % of at least one antioxidant, based on the total weight of the adhesive composition, for example, from 0.01 to 5 wt % of at least one antioxidant, preferably from 0.01 to 3 wt %, more preferably from 0.05 to 2 wt %, even more preferably from 0.05 to 0.5 wt %.

The at least one antioxidant can be selected from sterically hindered phenols, phosphites and mixtures thereof. Preferably, it is a mixture of a sterically hindered phenol and a phosphite. Sterically hindered phenols are well known in the art and refer to phenolic compounds which contain sterically bulky radicals, such as tert-butyl, in close proximity to the phenolic hydroxyl group thereof. In particular, they may be characterized by phenolic compounds substituted with tert-butyl groups in at least one of the ortho positions relative to the phenolic hydroxyl group. For example, the sterically hindered phenol has tert-butyl groups in both ortho-positions with respect to the hydroxyl group. Representative hindered phenols include pentaerythritol tetrakis(3-(3,5-di-tert-butyl-4-hydroxyphenyl)propionate), 1,3,5-trimethyl-2,4,6-tris(3,5-di-tert-butyl-4-hydroxybenzyl) benzene, n-octadecyl-3(3,5-di-tert-butyl-4-hydroxyphenyl) propionate, 4,4'-methylenebis(4-methyl-6-tert-butylphenol), 4,4'-thiobis(6-tert-butyl-o-cresol), 6-(4-hydroxyphenoxy)-2, 4-bis(n-ocytlthio)-1,3,5-triazine, 2,4,6-tris(4-hydroxy-3,5-di-tertbutyl-phenoxy)-1,3,5-triazine, di-n-octadecyl-3,5-di-tert-butyl-4-hydroxybenzylphosphonate, 2-(n-octylthio) ethyl-3,5-di-tert-butyl-4-hydroxybenzoate, and sorbitol hexa-(3,3,5-di-tert-butyl-4-hydroxy-phenyl) propionate.

In a particular embodiment, phosphites are aromatically substituted phosphites, preferably substituted or unsubstituted triphenyl phosphites. Examples of these phosphites include triphenyl phosphite, trisnonylphenyl phosphite, and tris(2,4-di-tert butylphenyl)-phosphite.

In a particular embodiment, the composition of the disclosure comprises 0.05 to 0.5 wt % of at least one antioxidant selected from sterically hindered phenols, aromatically substituted phosphites and mixtures thereof. In an embodiment, the antioxidant is a mixture of a sterically hindered phenol and an aromatically substituted phosphite, e.g. a mixture of pentaerythritol tetrakis(3-(3,5-di-tert-butyl-4-hydroxyphenyl)propionate) and tris(2,4-di-tert-butylphenyl)-phosphite.

Further additives that can be included in the compositions of the disclosure can be selected from the following:

Stabilizers;
fillers for reducing cost, adding bulk, improving cohesive strength (forming an aggregate-matrix composite material) and altering properties; e.g., calcium carbonate, barium sulfate, talc, silica, carbon black, clays (e.g., kaolin);
UV stabilizers which protect the material against degradation by ultraviolet radiation;
pigments and dyes;
biocides for hindering bacterial growth;
flame retardants;
antistatic agents:
ferromagnetic particles, hygroscopic water-retaining materials, or other materials which can yield a composition which can be activated by microwave heating; and/or
electrically conductive particles which can yield conductive Adhesive formulations.

The following examples merely illustrate the disclosure. Those skilled in the art will recognize many variations that can be performed without altering the functioning of the disclosure.

EXAMPLES

Example 1: Preparation of the DMC Catalyst

A typical example included step 1, step 2 and step 3 as described below, based on the methods disclosed in example 2 of WO2012/156431A1.

Step 1

Potassium hexacyanocobaltate (7.5 g) was dissolved in deionized water (100 ml) in a beaker (Solution A) Zinc chloride (75 g) and tert-butyl alcohol TBA (75 mL) were dissolved in deionized water (275 mL) in a second beaker (Solution B).

Solution B was heated at a temperature of 50° C. Subsequently, solution A was slowly added for 30 minutes to the solution B while stirring at 400 rpm. The aqueous zinc chloride and TBA solution and the cobalt salt solution were combined using a stirrer to intimately and efficiently mix both aqueous solutions. The mixture was held post-reacting for 30 minutes at the same temperature to form a slurry of zinc hexacyanocobaltate.

A third solution (solution C) was prepared by dissolving a 400 molecular weight diol (8 g, polypropylene glycol (PPG)) in deionized water (50 mL) and TBA (3 mL). Said diol has been synthesized by basic catalysis following procedures widely known in the art.

Solution C (the PPG/water/TBA mixture) was added to the aqueous slurry zinc hexacyanocobaltate for 5 minutes, and the product is stirred for 10 additional minutes. The mixture is filtered under pressure to isolate the solid.

Step 2

The solid cake is reslurried in water (208 mL) for 30 minutes at a temperature of 50° C. and subsequently, additional 400 molecular weight diol PPG (2 g) was added. The mixture was homogenized by stirring for 10 minutes and filtered.

Step 3

The solid cake obtained after the second step was reslurried in TBA (280 mL) for 30 minutes at a temperature of 50° C. and subsequently, additional 400 molecular weight diol PPG (1 g) were added. The mixture was homogenized by stirring for 5 minutes and filtered.

The resulting solid catalyst (catalyst 2) was dried under vacuum at 100° C. and 10 mbar to constant weight.

Example 2: General Procedure for the Preparation of the PoPCs

Following this general procedure, PoPCs were prepared using a glycerol-based polymeric polyol initiator and propylene oxide (PO) as alkylene oxide.

Preparation of Prepolymers

The pre-polymer was prepared as described in example 3 of WO2015/022290.

Glycerin (130 g) was charged into the reactor, purged with $N_2$ and dehydrated at 130° C. (until $H_2O$<500 ppm). Then, glycerin was stabilized at 50° C. and the catalyst $HBF_4$ (2 g, 50% wt in water) was added to the reactor. Propylene oxide feeding (868 g) was started slowly at atmospheric pressure, controlling the flow rate in order to control the temperature (50° C.) and pressure (below 1 bar). As the reaction proceeded it slowed down, increasing the pressure (pressure was controlled not to exceed 3 bar). When the reaction was finished, the mixture was left for 2 h (post-reaction). Subsequently, vacuum was applied for 1 h at 50° C. with $N_2$ stripping in order to remove residual monomers. Then, the reactor was cooled to 30° C. and the product discharged. The product obtained has the following properties: IOH=240±10 mg KOH/g; Humidity <500 ppm; Acidity <0.1 mg KOH/g; Viscosity <400 cps.

Preparation of Polymeric Polyol Initiators

The polymeric polyol initiator was prepared as described in examples 4-12 of WO2015/022290.

A two-liter stainless steel reactor was charged with 200 g of the above prepolymer. The reactor was heated to 130° C. while vacuum was applied with $N_2$ stripping. After reaching the desired temperature, vacuum was continued for 30 min more. When the prepolymer was dried ($H_2O$<100 ppm), the DMC catalyst prepared as described in example 1 (200 ppm) was added.

A first portion of propylene oxide was added to the reactor for the catalyst activation. A waiting time was observed until a temperature peak (hotspot) and a pressure drop occurs. Optionally, a second portion of propylene oxide was added in the absence of $CO_2$ and a waiting time was observed until activation occurred. Optionally, a third portion of propylene oxide was added in the absence of $CO_2$ and a waiting time was observed until activation occurred. Carbon dioxide was then introduced into the reactor until the desired pressure and a further portion of propylene oxide was added. After catalyst activation was observed, the remaining propylene oxide needed for a polyether carbonate triol Mw 3000, was slowly and continuously pumped into the reactor. When the carbon dioxide pressure decreased below a certain value, further $CO_2$ was admitted.

When co-feeding of propylene oxide and carbon dioxide was started, the temperature was decreased to 105° C. or 90° C. When propylene oxide addition was completed, the mixture was stirred at said temperature for 60 min. Finally, residual monomers were removed under vacuum with $N_2$ stripping for 1 h at 90° C. The reactor was cooled and the product discharged.

Preparation of Polymers According to the Disclosure

In a 2 l. stainless steel reactor the above polymeric polyol initiator and 40 wt % of propylene carbonate as solvent were added (% related to final weight: polymer+solvent).

The reactor was heated to 150° C., meanwhile vacuum was applied with $N_2$ stripping. After reaching the 150° C., vacuum continued for 30 minutes more.

Once the polymeric polyol initiator was dry ($H_2O$<100 ppm), the DMC catalyst of example 1 (400 ppm) was added.

Then the first amount of PO for activation was introduced from the deposit to the reactor (15% in weight based on initiator weight). Catalyst activation occurred when there was an increase in temperature (hotspot) and a pressure drop.

If required, a second activation was carried out with PO in the absence of $CO_2$ (for example, at 130° C.).

If required, a third activation was carried out with PO in the absence of $CO_2$ (for example, at 130° C.). Once the catalyst was activated, $CO_2$ was introduced into the reactor until the desired pressure of reaction.

A further amount of PO for activation was introduced into the reactor, at 110° C. A drop in pressure indicated that the catalyst had been activated.

Only after that, the rest of PO was continuously pumped slowly from the PO deposit.

At the same time, when the pressure of $CO_2$ decreased below a predetermined value, further $CO_2$ was added.

After beginning the feed of $PO+CO_2$, the temperature was lowered to 100° C.

Once the feeding of $PO+CO_2$ had finished, a post-reaction step at 100° C. was done.

Subsequently vacuum was applied for 1 hour at 100° C. with $N_2$ stripping in order to remove residual monomers.

The reactor was cooled to 60° C. and the product discharged.

Purification was effected by dispersing the sample in isopropanol (e.g. between 3:1 and 1:3 sample (grams): isopropanol (mL)) using a Dispermat LC55 for sufficient time and stirring to achieve an effective dispersion. Typically, about 200 g of the sample were dispersed in about 400 mL of isopropanol for 10-60 minutes at 100-500 rpm. Longer or shorter times depended on the viscosity of the samples. The dispersion was allowed to settle (e.g. for 2 to 40 hours) and then the isopropanol poured off. The process was repeated typically 3 times, although it depends on the purity required. For example, in order to test the properties of a further purified polymer of the disclosure, a batch was divided in samples 4 and 5 (see below), where the dispersion/decantation in isopropanol was repeated 3 times for sample 4, but 4 times for sample 5.

The reaction conditions are summarized in Table 1:

TABLE 1

| PoPC sample | Starter (g) | Pressure (bar) |
|---|---|---|
| 1 | 30 | 40 |
| 2 | 20 | 40 |
| 3 | 15 | 50 |
| 4 and 5 | 12 | 50 |

The properties of the resulting polymers are summarized in the following Table 2:

TABLE 2

| PoPC sample | Equivalent molecular weight[2] | $CO_2$ wt %[1] |
|---|---|---|
| 1 | 32,450 | 27.1 |
| 2 | 50,182 | 27.8 |
| 3 | 49,578 | 29.3 |
| 4 | 37,788 | 28.3 |
| 5 | 37,460 | 27.4 |

[1]As calculated according to example 6.
[2]Equivalent molecular weight is 56,100/IOH, wherein IOH is calculated according to ASTM E1899-16.

Example 3: Impact Modifying Properties of the PoPCs of the Disclosure

In order to test their properties, samples of the PoPCs of the disclosure were mixed with different polymers and the Charpy impact of the resulting mixture measured.

Each polymer tested (PPC, PHB, PS and PHA) and an impact modifier (comparative or PoPC according to the disclosure) were used in the proportions indicated in Table 3 below. They were mixed at a time and temperature sufficient to obtain a homogeneous mixture, typically at 50 rpm for 8-10 minutes. The samples from the mixer were compression molded at 100 bar for 3 min using a Collin polymer press to form squared plates for further characterizations. The temperature was chosen for each rigid polymer.

Charpy impact was analyzed using a CEAST Resil Impactor 18342 under the UNE-EN ISO 179-1:2011 (ISO179-1/1eA) standard method at 23° C. and 50% of humidity with 80×10×4 mm (width×length×thickness) of sample's dimension. The results are summarized in Table 3:

TABLE 3

| Mixture No | Low impact Polymer Tested | Impact modifier | Charpy Impact 23° C. (kJ/m$^2$) | Visual appearance |
|---|---|---|---|---|
| Comparative 1 | PPC1 | None | 2.00 | transparent |
| Comparative 2 | | SEBS (5%) | 2.30 | translucent |
| 1 | | PoPC 1 (5%) | 2.40 | transparent |
| 2 | | PoPC 1 (10%) | 2.60 | transparent |
| 3 | | PoPC 3 (5%) | 2.60 | transparent |
| 4 | | PoPC 3 (10%) | 2.80 | transparent |
| Comparative 3 | PLA | None | 2.40 | transparent |
| Comparative 4 | | SEBS (5%) | 2.40 | translucent |
| 5 | | PoPC 1 (5%) | 2.60 | transparent |
| 6 | | PoPC 1 (10%) | 2.80 | transparent |
| 7 | | PoPC 3 (5%) | 2.60 | transparent |
| 8 | | PoPC 3 (10%) | 2.60 | transparent |
| Comparative 5 | PHB | None | 1.30 | opaque |
| Comparative 6 | | SEBS (5%) | 1.90 | |
| 9 | | PoPC 3 (5%) | 2.20 | |
| Comparative 7 | PS | None | 1.30 | |

TABLE 3-continued

| Mixture No | Low impact Polymer Tested | Impact modifier | Charpy Impact 23° C. (kJ/m$^2$) | Visual appearance |
|---|---|---|---|---|
| Comparative 8 | | SEBS (5%) | 1.40 | |
| 10 | | PoPC 3 (5%) | 1.50 | |
| 11 | | PoPC 3 (10%) | 2.20 | |

PPC1: QPAC40 Empower Materials, polypropylene carbonate >75% alternating polypropylene carbonate, Tg=19° C., Mw=120,000 Da.

PHB: poly-3-hydroxybutyrate BIOMER, Tg=10° C., Mw=250,000 Da

PLA: PLA NW 2003D, Tg=60° C., Mw=120,000 Da

PS: Polystyrene EDISTIR N2380, Tg=97° C.

SEBS: Calprene CH6120, 68/32 ethylene-butylene/styrene thermoplastic copolymer, Brookfield viscosity 20% at 25° C., 1900 cp Gardner Haze-Gard Plus instrument was used to measure the haze, clarity and visible light transmission of samples according to the UNE-EN 2155-9:1992 and UNE-EN ISO 13468-1:1997 (2 mm thickness plates). Samples were considered transparent for transmittances above 75%, preferably above 80%, preferably above 85%, preferably above 90%, more preferably above 95%.

The PoPCs of the disclosure therefore provide impact modifying properties similar to those of typical SBS or MBS rubbers, and additionally maintain the transparency of the polymers. Thus, the PoPCs of the disclosure can be used as impact modifiers providing transparent blends. This opens the door for applications and improved blends not possible until now.

Example 4: Tack Properties of the PoPCs of the Disclosure

Tack of the PoPCs of the disclosure was measured using a computer Texture Analyzer TVT 6700 Perten Instrument (PerkinElmer) equipped with temperature controlled chamber. The sample (thickness 0.15 mm approx.) was placed inside the chamber and tack measures were performed at different temperatures starting at −10° C. and increasing the temperature until fibers started stick to the probe.

To measure tack, about 0.2 grams of the sample were placed on a steel plate. The steel plate with the sample was heated to 170° C. in an oven and then pressed at 100 kgf in a press fitted to room temperature until the plate was cooled.

The tack was measured using a cylindrical stainless steel probe with smooth contact surface of 2 mm.

The experimental conditions used during the test were the following:

approach speed of the probe to the sample: 1 mm/s.

force applied to the sample: 5N.

Time of application of force: 1 s.

separation speed of the sample from the probe 1 mm/s.

Maximum tack values at different temperatures are shown in Table 4. All PoPCs of the disclosure display high tack at temperatures between −5 and 5° C. This makes the PoPCs of the disclosure suitable for freeze and deep freeze application.

TABLE 4

| T (° C.) | Tack sample 1 (KPa) | Tack sample 2 (KPa) | Tack sample 3 (KPa) | Tack sample 5 (KPa) |
|---|---|---|---|---|
| −20 | 550 | 112 | 310 | 500 |
| −10 | 881 | 410 | 733 | 1,176 |
| −5 | | | 605 | |
| 0 | 1,057 | 1,390 | 634 | 2,018 |
| 5 | | 1,490 | 561 | |
| 10 | 934 | | 1,340 | 1,521 |
| 20 | 1,160 | 1,110 | 928 | 980 |
| 30 | | | 765 | |
| 35 | 870 | 955 | 838 | 820 |
| 40 | | | 729 | |
| 50 | | | 486 | |
| 60 | | | 522 | |
| 70 | | | 466 | |
| 75 | | | 429 | |

The PoPCs of the disclosure are thus useful as adhesives, for example, at temperatures below 30° C., below 25° C., below 20° C., below 15° C., or below 10° C., for example at temperatures between −30° C. and 20° C., between −25° C. and 15° C., between −10° C. and 10° C., between −5° C. and 5° C.

Example 5: Peel Adhesion at 180°

The peel test is used as a quantitative measure of the resistance to adhesion and separation of an adhesive between two substrates.

The first part requires the preparation of test samples using rollers at 175° C. The adhesive is applied at this temperature for 5-10 min between two substrates, one being acetate (thickness 50 micrometers) and the other being waxed paper (45 micrometers), in order to control the thickness of the adhesive (50 micrometers). Once ready, the wax paper is removed and the aluminum substrate coupled (210 micrometers) at room temperature. Subsequently, the adhesion was evaluated in a universal testing machine Instron Model 3365 using the maximum speed of separation. The peel test is performed at 180°, but some test samples make different angles depending on the peel strength. After the first strength peak, at least 127 mm of tape are peeled off and load is determined at that peel off distance from the test sample.

Values for the PoPC samples tested are shown in Table 5, which show the good adhesion properties thereof.

TABLE 5

| | PoPC 1 | PoPC 4 | PoPC 5 |
|---|---|---|---|
| Load (N/cm) | >22 | >24.5 | >22 |

Example 6: Calculation of Weight Percentage of Carbon Dioxide and Mol Percentage of Random Carbonate The amount by weight (in wt %) of $CO_2$ incorporated in the resulting polyether carbonate polyol, and the ratio of propylene carbonate to polyether carbonate polyol, were determined by means of $^1$H-NMR (Bruker AV III HD 500, 500 MHz, pulse program zg30, waiting time dl: 0.1 s, 120 scans). The sample was dissolved in deuterated chloroform. The relevant resonances in the $^1$H-NMR (based on TMS=0 ppm) are as follows: Cyclic carbonate=1.50 ppm (3H); Polyether carbonate polyol=1.35-1.25 ppm (3H); Polyether polyol: 1.25-1.05 ppm (3H).

The amount by weight (in wt %) of polymer bonded carbonate (CP) in the polyether carbonate polyol was calculated according to formula (I):

$$CP = F(1.35-1.25) \times 102 \times 100/Np \quad (I)$$

wherein:
F(1.35-1.25) is the resonance area at 1.35-1.25 ppm for polyether carbonate polyol (corresponds to 3 H atoms); the value for Np ("denominator" Np) was calculated according to formula (II):

$$Np = F(1.35-1.25) \times 102 + F(1.25-1.05) \times 58 \quad (II)$$

being F(1.25-1.05) the resonance area at 1.25-1.05 ppm for polyether polyol (corresponds to 3 H atoms).

The factor 102 results from the sum of the molar masses of $CO_2$ (molar mass 44 g/mol) and of propylene oxide (molar mass 58 g/mol) and the factor 58 results from the molar mass of propylene oxide.

The amount by weight (in wt %) of $CO_2$ in polymer was calculated according to formula (III)

$$\% \ CO_2 \ in \ polymer = CP \times 44/102 \quad (III)$$

The amount by weight (wt %) of cyclic carbonate (CC') in the reaction mixture was calculated according to formula (IV):

$$CC' = F(1.50) \times 102 \times 100/N \quad (IV)$$

wherein:
F(1.50) is the resonance area at 1.50 ppm for cyclic carbonate (corresponds to 3 H atoms); the value for N ("denominator" N) was calculated according to formula (V)

$$N = F(1.35-1.25) \times 102 + F(1.50) \times 102 + F(1.25-1.05) \times 58 \quad (V)$$

Mol % random carbonate = $F(1.35-1.25) \times 100/(F(1.35-1.25) + F(1.25-1.05))$ Mol % polyether polyol = $F(1.25-1.05) \times 100/(F(1.35-1.25) + F(1.25-1.05))$

Example 7: Optical Properties

In addition to the properties discussed above, a further advantage of the PoPCs of the disclosure is their clarity. Using test samples of 1.5 mm the optical properties of the PoPCs of the disclosure were tested in terms of turbidity, clarity and visible light transmittance (VLT). The results are shown in table 6:

TABLE 6

|  | PoPC 1 | PoPC 2 | PoPC 3 | PoPC 4 | PoPC 5 |
|---|---|---|---|---|---|
| turbidity (%) | 16 | 12.2 | 10.2 | 17.5 | 13.8 |
| Clarity (%) | 55 | 55.7 | 56.4 | 51.6 | 45.7 |
| VLT (%) | 88 | 91.1 | 91.8 | 90.3 | 922 |

It is remarkable that all PoPCs of the disclosure have a turbidity lower than 18%.

Example 8: GPC Measurement of Weight-Averaged Molecular Weight and Weight Percentage of Molecules Having a Weight-Averaged Molecular Weight Above 100,000

The weight percentage of molecules having a weight-averaged molecular weight above 100,000 Da in a given PoPC were in general measured against polystyrene standards by gel-permeation chromatography (GPC) using two PLGel Mixed C columns connected in series using a 1 ml/min THF flow without stabilizer, and a refraction index detector (RID) at 35° C. in an Agilent 1260 series HPLC. The solvent in the samples and the standards was THF without stabilizer. Different standards were used having different molecular weights.

In this particular example the standards used, their molecular weights and retention times (RT in minutes) are shown in Table 7 (see FIG. 1):

TABLE 7

| RT (min) | g/mol PS | STANDARD |
|---|---|---|
| 13.0 | 50,000 | S1 |
| 12.4 | 100,000 | S2 |
| 11.7 | 200,000 | S3 |
| 11.0 | 400,000 | S4 |
| 10.65 | 600,000 | S5 |

The results are shown in FIG. 1. The weight percentage of molecules having a weight-averaged molecular weight above 50,000, above 100,000, above 200,000 and above 400,000 is given in Table 8 for the PoPCs of example 1 and 3:

TABLE 8

|  | Example 1 | Example 3 |
|---|---|---|
| wt % having >50,000 g/mol | 15.6 | 27.2 |
| wt % having >100,000 g/mol | 6.7 | 15.0 |
| wt % having >200,000 g/mol | 2.0 | 5.9 |
| wt % having >400,000 g/mol | 0.4 | 1.3 |

Example 9: Calculation of Polydispersity

All polydispersity (PI) values were calculate in the usual way, concretely by dividing the weight-averaged molecular weight (Mw) between the number-averaged molecular weight (Mn), that is PI=Mw/Mn. Both, Mn and Mw are calculated from the GPC measurements described in example 8. PoPC 1 presented a polydispersity of 2.1, and PoPC 3 a polydispersity of 2.4.

The invention claimed is:

1. A polyether carbonate polyol with a nominal functionality of 3 or more, having an equivalent molecular weight between 20,000 and 75,000 Da, and a content of between 0.5 wt % and 35 wt % of $CO_2$, based on the total weight of the polyether carbonate polyol,
wherein
nominal functionality refers to the average number of active hydrogen atoms of the initiator or initiators used in its preparation; and
the equivalent molecular weight is calculated according to the formula Equivalent molecular weight = 56,100/IOH wherein IOH is the hydroxyl number in mg of KOH per grams of sample, as calculated according to ASTM E1899-16.

2. The polyether carbonate polyol according to claim 1, wherein the equivalent molecular weight is comprised between 25,000 and 75,000 Da.

3. The polyether carbonate polyol according to claim 1, having a content of between 5 wt % and 35 wt % of $CO_2$, based on the total weight of the polyether carbonate polyol.

4. The polyether carbonate polyol according to claim 1, having a content of between 25 wt % and 35 wt % of $CO_2$, based on the total weight of the polyether carbonate polyol.

5. The polyether carbonate polyol according to claim 1, having a nominal functionality of 3 or 4.

6. The polyether carbonate polyol according to claim 1, wherein the weight percentage of molecules having a weight-averaged molecular weight above 100,000 greater than 3 wt %, based on the total weight of the polyether carbonate polyol.

7. The polyether carbonate polyol according to claim 1, wherein the weight percentage of molecules having a weight-averaged molecular weight above 100,000 greater than 3 wt %, based on the total weight of the polyether carbonate polyol, and the weight percentage of molecules having a weight-averaged molecular weight above 200,000 greater than 0.5 wt %, based on the total weight of the polyether carbonate polyol.

8. The polyether carbonate polyol according to claim 1, having a nominal functionality of 3, and a content of between 22 wt % and 33 wt % of $CO_2$, based on the total weight of the polyether carbonate polyol, and an equivalent molecular weight comprised between 25,000 and 75,000 Da.

9. The polyether carbonate polyol according to claim 1, having a polydispersity comprised between 1.5 and 5.0.

10. A blend comprising the polyether carbonate polyol as defined in claim 1 and a second polymer selected from the group consisting of polylactic acid, polyalkylcarbonates, polyhydroxyalkanoates, polyolefins, vinyl polymers, polyesters and mixtures thereof.

11. An adhesive composition comprising a polyether carbonate polyol as defined in claim 1.

* * * * *